United States Patent [19]

Balken et al.

[11] Patent Number: 4,591,212
[45] Date of Patent: May 27, 1986

[54] WHEEL BEARING ASSEMBLY

[75] Inventors: Jochen Balken, Neunkirchen-S.; Werner Krude, Siegburg, both of Fed. Rep. of Germany; Michel A. Orain, Conflans-Sainte-Honorine, France

[73] Assignee: Uni-Cardan Aktiengesellschaft, Siegburg, Fed. Rep. of Germany

[21] Appl. No.: 544,595

[22] Filed: Oct. 24, 1983

[30] Foreign Application Priority Data

Oct. 22, 1982 [DE] Fed. Rep. of Germany ....... 3239058

[51] Int. Cl.$^4$ ............................................. B60B 27/02
[52] U.S. Cl. ................. 301/105 R; 301/125; 384/512
[58] Field of Search ............... 384/504, 512, 517, 584, 384/585; 301/105 R, 125

[56] References Cited

U.S. PATENT DOCUMENTS 1,458,684 6/1923 Cook .
4,240,681 12/1980 Stolz et al. .......................... 384/512

FOREIGN PATENT DOCUMENTS 2654607 6/1978 Fed. Rep. of Germany .
2183543 12/1973 France .

OTHER PUBLICATIONS

Standard Handbook for Mechanical Engineers–Baumeister & Marks, 1967, by McGraw-Hill, pp. 8-183 to 8-184.

Primary Examiner—David A. Scherbel
Attorney, Agent, or Firm—Toren, McGeady, Stanger, Goldberg & Kiel

[57] ABSTRACT

A bearing assembly particularly for the wheel of a motor vehicle wherein a wheel hub and a part of a universal joint are arranged in torque-transmitting engagement, the assembly including an inner race member formed by at least one of the wheel hub and the part of the universal joint in torque-transmitting engagement therewith and an outer race member adapted to be connected with the wheel carrier of the motor vehicle. First and second inner bearing tracks are formed in the inner race member and first and second outer bearing tracks are formed in the outer race member. A first and a second plurality of rolling elements are disposed in operative load-bearing engagement between the first inner and outer bearing tracks and the second inner and outer bearing tracks, respectively, and the outer race member is formed in two separate parts, one part having the first outer bearing track therein and the other part having the second outer bearing track therein. The two parts of the outer race member are arranged to be aligned with each other, and a securing device is provided for securing the two parts of the outer race member in the aligned position.

4 Claims, 3 Drawing Figures

WHEEL BEARING ASSEMBLY

The present invention relates generally to a wheel bearing assembly particularly for use in motor vehicles and more particularly to a bearing assembly consisting of a double row of bearing elements which is capable of radial and axial load-bearing operation.

In a device of the type to which the present invention relates, the outer race of the assembly is provided with a flange for fixing the bearing assembly to a wheel carrier of a motor vehicle and the inner race may be formed from the outer member of a rotary constant velocity universal joint through which the wheel hub is driven.

In such a bearing assembly, it has previously been proposed to provide the running grooves or tracks of the inner race member of the bearing assembly in a unitary member which includes a sleeve and a wheel hub receiving flange and to provide the running grooves or tracks of the outer race in a unitary member which includes a flange adapted for connection to the wheel carrier. The sleeve may also form the outer part of the rotary constant velocity universal joint if the bearing assembly is intended for the driven wheel of a motor vehicle. An arrangement of this type is disclosed in British Patent No. 1 416 989.

The disadvantage of a structure of this type is that there results a relatively large diameter for the bearing. In order to effect assembly of the bearing, the single component design requires that certain diameter dimensions be maintained. First, it is necessary to position the two race members with their respective axes offset radially, e.g., one above the other, when the axes are horizontal in order to enable introduction of rolling elements such as spherical balls into operative position. Only a maximum of half of the circumference may be filled with the balls. Subsequently, the balls must be distributed circumferentially and held in their repsective distributed positions by means of a cage which is axially introduced into the assembly. The relatively small degree to which the bearing may be filled with balls, i.e., the restricted number of balls which may be utilized, considerably limits the load-transmitting capacity of the bearing relative to the attainable capacity created by the diameters of the races.

Divided bearing structures are also known wherein the running tracks for the rolling members of the bearing are arranged in separate bearing rings, for example, as disclosed in British Patent No. 1 298 552. However, the arrangement of the running grooves or tracks in separate bearing rings eliminates an advantage in that the possibility of reducing the diameter due to a more favorable degree of filling is lost, since the diameter must be increased because of the required mimimum thickness of the separate bearing rings.

Therefore, the present invention is directed toward provision of a bearing assembly whereby the degree by which the assembly may be filled with balls is increased and whereby the load-carrying capacity is also increased while simultaneously permitting a reduction in diameter.

SUMMARY OF THE INVENTION

The present invention may be described as a bearing assembly for a wheel driven through a universal joint particularly for a motor vehicle wherein wheel hub means of said wheel are arranged in driven engagement with a part of said universal joint comprising: inner race means formed by at least one of said wheel hub means and said part of said universal joint; outer race means adapted to be connected with wheel carrier means of said motor vehicle; first and second inner bearing tracks formed in said inner race means; first and second outer bearing tracks formed in said outer race means; a first plurality of rolling elements disposed in operative load-bearing engagement between said first inner and outer bearing tracks; a second plurality of rolling elements disposed in operative load-bearing engagement between said second inner and outer bearing tracks; said outer race means being formed in two separate parts, one of said parts having said first outer bearing track formed therein and the other of said parts having said second outer bearing track formed therein; aligning means for aligning said two parts of said outer race means in operative position relative to each other; and securing means for securing in aligned position said two parts of said outer race means.

The advantage of a structure in accordance with the invention is that there no longer exists a need for separate bearing rings, a measure which results in a decrease in diameter and an increase in the degree to which the assembly may be filled with rolling members thereby in turn increasing the load-bearing capacity of the assembly. Furthermore, dividing of the outer race means into two parts does not adversely affect the strength of the assembly. Preferably, both parts of the outer race means should be designed as a flange member whereby the outer race means may be affixed to the wheel carrier means and fixing holes may be provided in the flange parts with bushes provided in these holes having ends which are deformed in such a manner that the flange parts are firmly axially connected to each other. In this manner, the bushes act as the securing means for securing together the two parts of the outer race means.

An alternative embodiment of the invention is constructed so that the two parts of the outer race means are designed as flanges and so that they are held axially and radially by a clamping ring. Thus, the securing means are embodied in the clamping ring and the function of centering of the flange parts is also undertaken by the clamping ring which also acts as the aligning means.

In order to facilitate production and assembly of the flange parts, the bearing tracks are provided on one axial side thereof with an undercut-free runout which provides a lateral entry passage facilitating assembly of the rolling members.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

DETAILED DESCRIPTION OF THE PREFERRED EMBODIMENTS

Figure 1:
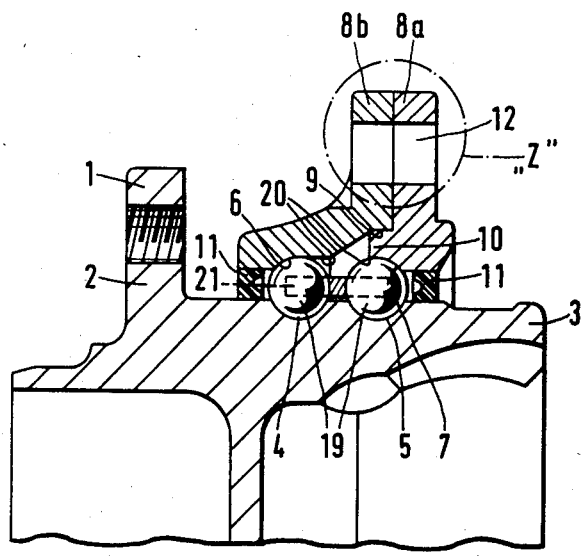
FIG. 1 is a longitudinal sectional view showing a bearing assembly in accordance with the invention.

Referring now to the drawings, and particularly to FIG. 1, there is shown a bearing assembly for the wheel of a motor vehicle wherein the inner race means of the bearing assembly are formed as comprising a wheel hub 2 having a flange portion 1 for engagement with a wheel to be supported, with the other end portion of the inner race means being formed from an outer member 3 of a rotary constant velocity universal joint. For simplification, the remaining parts of the rotary constant velocity universal joint are not shown in the drawings.

The inner race means comprised of the wheel hub 2 and the outer member 3 is formed on the outer surface thereof with running grooves or bearing tracks 4 and 5 which form first and second inner bearing tracks of the bearing assembly.

The bearing assembly is also composed of outer race means which are comprised of a pair of outer race members 8a and 8b each formed as individual flange elements adapted for attachment to the wheel carrier means of a motor vehicle. The individual outer race members 8a and 8b are each formed, respectively, with first and second outer bearing tracks 7 and 6 of the bearing assembly, the outer race member 8a having formed therein the track 7 and the outer race member 8b having formed therein the track 6. Both of the outer race members 8a and 8b are centered relative to each other by a centering projection 10 and they are provided with a receiving bore 9. The interior of the bearing assembly is sealed by a seal member 11 arranged between the two outer race members 8a, 8b and the inner race member.

The bearing assembly is also essentially comprised of a plurality of rolling elements 19 formed as two rows of spherical balls, with one row of spherical balls 19 being in operative load-bearing engagement between the first inner and outer bearing tracks 5, 7 and with the second row of balls 19 being in operative load-bearing engagement between the second inner and outer bearing tracks 4, 6.

The balls are held in operative load-bearing engagement in their respective positions by a cage 21 and the outer bearing tracks 6 and 7 of the two outer race members 8a, 8b in which the receiving bores 9 are formed are open toward one end thereof so that there is no undercut, i.e., they are formed with an area having an undercut-free running groove runout 20 which is at least parallel relative to the axis of the assembly. Thus, the tracks 6 and 7 are formed with one lateral boundary or wall portion which is open laterally at opposed inner lateral boundaries which in combination with the grooves 4 and 5 define the entry passage 20 which permits lateral assembly between each pair of opposed grooves 4, 6 and 5, 7 of the balls 19 by relative passage through the passageway 20. In practice, the balls 19 may be loaded between the grooves 4 and 6 and further balls may then be assembled in groove 7 and the part of the outer race means incorporating the part 8a may then be moved axially over the end 3 of the inner race member. The number of balls is not limited to those balls which fill only half of the circumferential length of the ball receiving channel between opposed grooves, but may exceed such number.

Figures 2, 3:
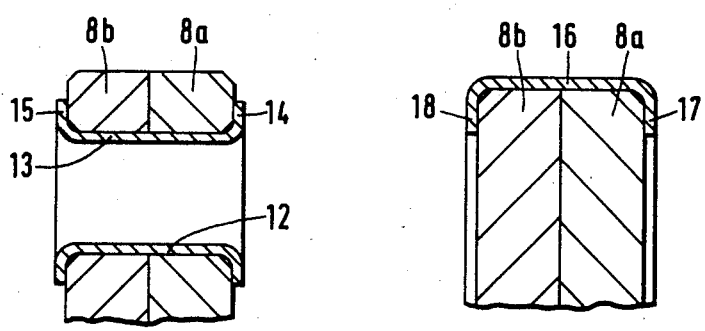
FIG. 2 is a sectional view showing in greater detail one embodiment of the invention.
FIG. 3 is a sectional view showing in detail an alternative embodiment of the invention.

In FIG. 2 there is shown in greater detail a portion Z of the outer race means identified in FIG. 1. In the detail of FIG. 2, there is provided bushes 13 which are inserted into the aligned holes of the members 8a, 8b forming the flange hole 12. In FIG. 2, the bush 13 operates for connecting together the two parts 8a and 8b of the outer race means. The bushes 13 are inserted into the holes 12 of the members 8a and 8b and the ends 14, 15 of the bushes 13 are deformed in such a manner that they are secured with respect to the end faces of the members 8a, 8b. Thus, the deformed ends 14, 15 of the bushes 13 operate to secure the two parts of the outer race means against axial separation relative to each other and they also serve to apply an axial preload to the race means and to the rolling elements 19.

An alternative embodiment of the invention is shown in FIG. 3 wherein the two members 8a and 8b of the outer race means formed as flange parts may be affixed together by a clamping ring 16 having two sides 17 and 18 which grip the flange parts or race members 8a and 8b thereby holding them together in axially fixed position relative to each other and applying a preload to the bearing components previously mentioned. The clamping ring 16 may also serve for centering of the two flange elements or race members 8a, 8b in which case there is eliminated the need for the centering projection 10 and the receiving bore 9.

In the case of the flange part 8a, for example, it is also possible to eliminate the part containing the fixing bores 12 so that it consists only of a component which is provided with the outer bearing track 7 and which is centered and additionally fixed by means of the centering projection 10 and the receiving bore 9 relative to the flange and by means of the other outer bearing track 6. Of course, some holes or other formations would be required on one or both of the race elements 8a, 8b in order to enable the outer race means to be secured to the wheel carrier of the vehicle.

The inner grooves are formed of a cross-sectional configuration so as to provide wall portions for bearing axial loads in both axial directions. Furthermore, the balls 19 forming the two bearing rows are held circumferentially in the bearing tracks 4, 6 and 5, 7 and they may be held respectively by one single cage 21 or even by two cages arranged in a row.

Thus, from the foregoing it will be seen that the invention provides a bearing assembly for the wheel hub of a motor vehicle arranged at the respective wheel carrier and consisting of a double row axial-radial bearing assembly. The bearing assembly may be designed either in such a way that it serves only to support non-driven wheels or it may include the outer part of a rotary constant velocity universal joint pertaining to a drive shaft of the wheel for transmitting torque from the engine to the wheel. The invention enables the structure to be formed with a compact design consisting of as few parts as possible, and this objective is achieved in that the outer ring of the bearing ring is divided into two parts and is formed as two flange members which are centered and which are clamped relative to each other.

While specific embodiments of the invention have been shown and described in detail to illustrate the application of the inventive principles, it will be understood that the invention may be embodied otherwise without departing from such principles.

What is claimed is:

1. A bearing assembly for a wheel driven through a universal joint particularly for a motor vehicle wherein wheel hub means of said wheel are arranged in driven engagement with a part of said universal joint comprising: inner race means formed by at least one of said wheel hub means and said part of said universal joint; outer race means adapted to be connected with wheel carrier means of said motor vehicle; first and second inner bearing tracks formed in said inner race means; first and second outer bearing tracks formed in said outer race means; a first plurality of rolling elements disposed in operative load-bearing engagement between said first inner and outer bearing tracks; a second plurality of rolling elements disposed in operative load-bearing engagement between said inner and outer bearing tracks; said outer race means being formed in two separate parts, one of said parts having said first outer bearing tracks formed therein and the other of said parts having said second outer bearing tracks formed therein; said first and second outer bearing tracks being formed respectively free of undercuts in the axial direction of said assembly so as to allow a filling of said first inner and outer bearing tracks and said second inner and outer bearing tracks with said first and said second plurality of rolling elements respectively; and alignment and securing means for aligning said two parts of said outer race means in operative position relative to each other and for securing said two parts of said outer race means in aligned position; said securing means being formed as clamping elements clamping said two separate parts of said outer race means together to hold them in relative alignment with each other both radially and axially while simultaneously applying a preload to said bearing assembly, said alignment means comprising an axially directed centering extension formed on one of said two separate parts of said outer race means and a receiving bore formed on the other of said two separate parts engaging said centering extension to align said two separate parts together.

2. An assembly according to claim 1 wherein said two parts of said outer race means are designed as flange members having fixing bores therein, said clamping elements comprising bushes having ends which are deformed in such a manner that said parts of said outer race means are axially firmly connected together, said bushes thereby operating as said securing means for securing said two parts in aligned position.

3. An assembly according to claim 1, wherein said two separate parts of said outer race means are designed as flange members having an outer circumferential surface and wherein said alignment and securing means comprise a clamping ring extending circumferentially around said flange members and to also extend in a radially inward direction to apply axially directed clamping forces holding said two separate parts together.

4. An assembly according to claim 1, wherein said first plurality of rolling elements and said second plurality of rolling elements comprise an equal number of rolling elements distributed over the periphery of said first and second inner and outer bearing tracks, said bearing assembly comprising a single cage member retaining both said first and said second plurality of rolling elements in place.

* * * * *